US012658206B2

(12) United States Patent
Biskeborn et al.

(10) Patent No.:  US 12,658,206 B2
(45) Date of Patent:      Jun. 16, 2026

(54) SERVO WRITE HEAD FOR WRITING SERVO PATTERNS HAVING OPPOSITE-POLARITY BARS

(71) Applicant: Western Digital Technologies, Inc., San Jose, CA (US)

(72) Inventors: Robert G Biskeborn, Hollister, CA (US); David J. Seagle, Morgan Hill, CA (US); Nurul Amin, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/675,266

(22) Filed: May 28, 2024

(65) Prior Publication Data

US 2025/0372122 A1      Dec. 4, 2025

(51) Int. Cl.
*G11B 5/48*          (2006.01)
(52) U.S. Cl.
CPC ................................... *G11B 5/4893* (2013.01)
(58) Field of Classification Search
CPC .................................................... G11B 5/4893
See application file for complete search history.

(56) References Cited

U.S. PATENT DOCUMENTS

| | | | |
|---|---|---|---|
| 5,689,384 A | 11/1997 | Albrecht et al. | |
| 5,930,065 A | 7/1999 | Albrecht et al. | |
| 8,059,350 B2 | 11/2011 | Albrecht et al. | |

| | | | |
|---|---|---|---|
| 8,941,949 B1* | 1/2015 | Cherubini | .......... G11B 5/00826 |
| | | | 360/121 |
| 9,830,943 B2 | 11/2017 | Cherubini et al. | |
| 2004/0223248 A1 | 11/2004 | Dugas et al. | |
| 2005/0254163 A1* | 11/2005 | Nakao | ................ G11B 5/59633 |
| | | | 360/75 |
| 2006/0061906 A1* | 3/2006 | Dugas | .................. G11B 5/1877 |
| 2009/0040643 A1 | 2/2009 | Weng et al. | |
| 2010/0079890 A1 | 4/2010 | Brummet | |
| 2013/0321953 A1 | 12/2013 | Dellmann et al. | |
| 2015/0043101 A1 | 2/2015 | Biskeborn et al. | |

(Continued)

OTHER PUBLICATIONS

J. B. C. Engelen et al., "Planar Thin-Film Servo Write Head for Magnetic Tape Recording, " in IEEE Transactions on Magnetics, vol. 48, No. 11, pp. 3539-3542, Nov. 2012, (Year: 2012).*

(Continued)

*Primary Examiner* — Steven Lim
*Assistant Examiner* — Michelle J. Kim
(74) *Attorney, Agent, or Firm* — Patterson + Sheridan, LLP

(57) ABSTRACT

The present disclosure generally relates to a servo write bar comprising one or more servo write heads for writing servo patterns on a tape. Each servo write head comprises a first end pole, a second end pole, and a center pole disposed between the first and second end poles. The center pole is spaced from the first end pole by a first gap, and spaced from the second end pole by a second gap. A coil coupled to a current source is disposed around the center pole. A top surface is disposed over the center pole, and the first and second end poles. A servo pattern is disposed on the top surface over the coil. A first servo line of the servo pattern is disposed over the first gap, and a second servo line of the servo pattern is disposed over the second gap.

25 Claims, 8 Drawing Sheets

(56) References Cited

U.S. PATENT DOCUMENTS

2017/0076747 A1*  3/2017  Cherubini ......... G11B 5/00817
2021/0082462 A1     3/2021  Bradshaw

OTHER PUBLICATIONS

IBM, "Advance tape technologies", Feb. 9, 2021, www.zurich.ibm.com/sto/tape/servo/planar.html.
S. Furrer, A. Pantazi, G. Cherubini and M. A. Lantz, "Resolution Limits of Timing-Based Servo Schemes in Magnetic Tape Drives," in IEEE Transactions on Magnetics, vol. 51, No. 11, pp. 1-4, Nov. 2015, Art No. 3101504, doi: 10.1109/TMAG.2015.2436718.

* cited by examiner

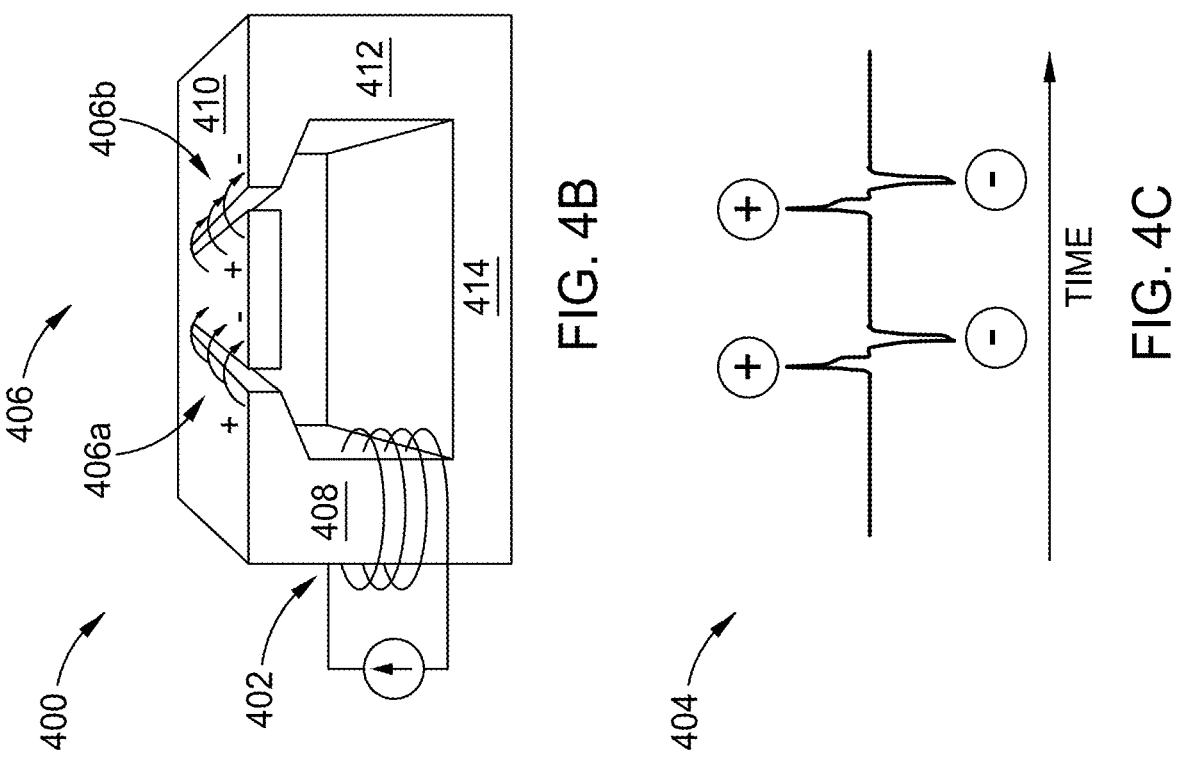
FIG. 4B
FIG. 4C
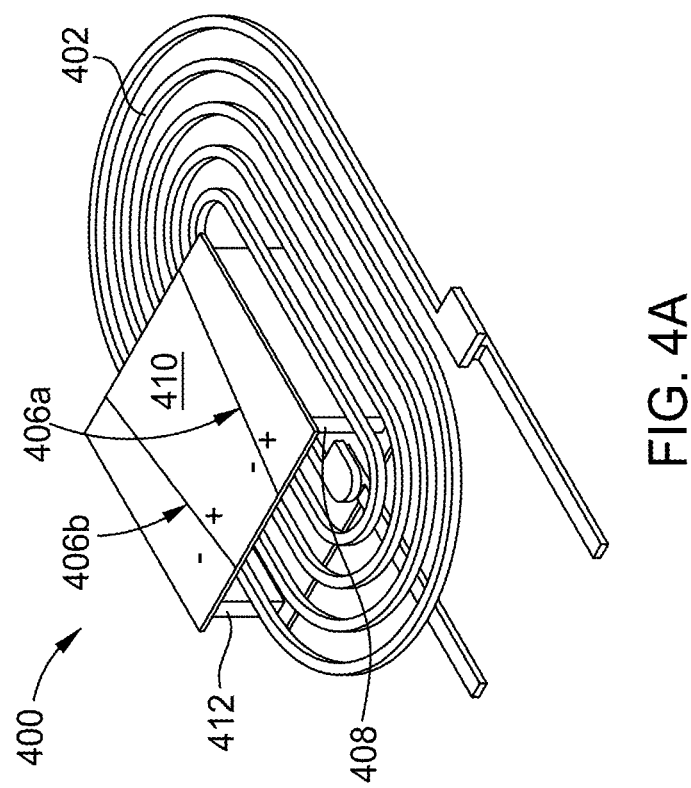
FIG. 4A

TIME

SERVO WRITE HEAD FOR WRITING SERVO PATTERNS HAVING OPPOSITE-POLARITY BARS

BACKGROUND OF THE DISCLOSURE

Field of the Disclosure

Embodiments of the present disclosure generally relate to a servo write head for writing servo patterns on a tape.

Description of the Related Art

Tape heads of tape drive systems are used to record and read back information on tapes by magnetic processes. Magnetic transducers of the tape heads read data from and write data onto magnetic recording media. Data is written on the magnetic recording media by moving a magnetic write transducer to a location over the media where the data is to be stored. The magnetic write transducer then generates a magnetic field, which encodes the data into the magnetic media. Data is read from the media by the magnetic read transducer through sensing of the magnetic field of the magnetic media.

To position the tape head accurately when reading from and writing to a magnetic tape, servo heads are used to read servo positioning information from servo tracks on the tape. The servo tracks comprising the positioning information are written to the tape once, at the media factory, during the manufacture of the tape using a servo write bar that is part of a device for writing servo patterns on the tape. The servo write bar comprises one or more servo write heads. Generally, each servo write head comprises a coil wrapped around a pole of the servo write head. Current is applied to the coil to generate magnetic flux, which then imprints a servo pattern on the tape. However, due to the positioning of the coil, the magnetic flux generated is unevenly distributed to the servo pattern.

Therefore, there is a need in the art for improved servo write heads of a servo write bar.

SUMMARY OF THE DISCLOSURE

The present disclosure generally relates to a servo write bar comprising one or more servo write heads for writing servo patterns on a tape, and a device for writing servo patterns on the tape comprising such a write bar. Each servo write head comprises a first end pole, a second end pole, and a center pole disposed between the first and second end poles. The center pole is spaced from the first end pole by a first gap, and spaced from the second end pole by a second gap. A coil coupled to a current source is disposed around the center pole. A top surface is disposed over the center pole, and the first and second end poles. A servo pattern is disposed on the top surface over the coil. A first servo line of the servo pattern is disposed over the first gap, and a second servo line of the servo pattern is disposed over the second gap.

In one embodiment, a servo write bar comprises one or more servo write heads, each of the one or more servo write heads comprising: a first end pole, a second end pole, a center pole disposed between the first and second end poles, at least one coil wrapped around the center pole, the first end pole, or the second end pole, a top surface disposed over the at least one coil, the first end pole, the second end pole, and the center pole, and a servo pattern disposed on the top surface, the servo pattern comprising a first servo line disposed between the first end pole and the center pole and a second servo line disposed between the center pole and the second end pole.

In another embodiment, a servo write bar comprises one or more servo write heads, each of the one or more servo write heads comprising: a first end pole, a second end pole, a center pole disposed between the first and second end poles, the center pole being spaced from the first end pole by a first gap and spaced from the second end pole by a second gap, a coil disposed around the center pole and within the first and second gaps, and a servo pattern disposed over the coil, the servo pattern comprising a first servo line disposed over the first gap and a second servo line disposed over the second gap.

In yet another embodiment, a servo write bar comprises one or more servo write heads, each of the one or more servo write heads comprising: one or more servo write heads, each of the one or more servo write heads comprising: a first end pole, a second end pole, a center pole disposed between the first and second end poles, the center pole being spaced from the first end pole by a first gap and spaced from the second end pole by a second gap, a coil disposed around the center pole and within the first and second gaps, a current source coupled to the coil, a top surface disposed over the coil, the first end pole, the second end pole, and the center pole, and a servo pattern disposed on the top surface, the servo pattern comprising a first servo line disposed over the first gap and a second servo line disposed over the second gap.

A tape comprising a plurality of data tracks having a tape width, a first servo track disposed adjacent to a first end of the tape width and a second servo track disposed adjacent to a second end of the tape width opposite the first end, the first and second servo tracks each individually comprising a plurality of servo pairs, wherein each servo pair comprises: a first servo bar having an outer edge and an inner edge, the outer edge having a positive magnetic field and the inner edge having a negative magnetic field, and a second servo bar disposed adjacent to the first servo bar, the second servo bar having an inner edge disposed adjacent to the outer edge of the first servo bar and an inner edge, wherein the inner edge of the second servo bar has a negative magnetic field and the outer edge of the second servo bar having a positive magnetic field.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 4A-4B illustrate a conventional servo write head.

FIG. 4C illustrates current pulses generated by the conventional servo write head of FIGS. 4A-4B during operation.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a servo write bar comprising one or more servo write heads for writing servo patterns on a tape, and a device for writing servo patterns on the tape comprising such a write bar. Each servo write head comprises a first end pole, a second end pole, and a center pole disposed between the first and second end poles. The center pole is spaced from the first end pole by a first gap, and spaced from the second end pole by a second gap. A coil coupled to a current source is disposed around the center pole. A top surface is disposed over the center pole, and the first and second end poles. A servo pattern is disposed on the top surface over the coil. A first servo line of the servo pattern is disposed over the first gap, and a second servo line of the servo pattern is disposed over the second gap.

Figure 1A:
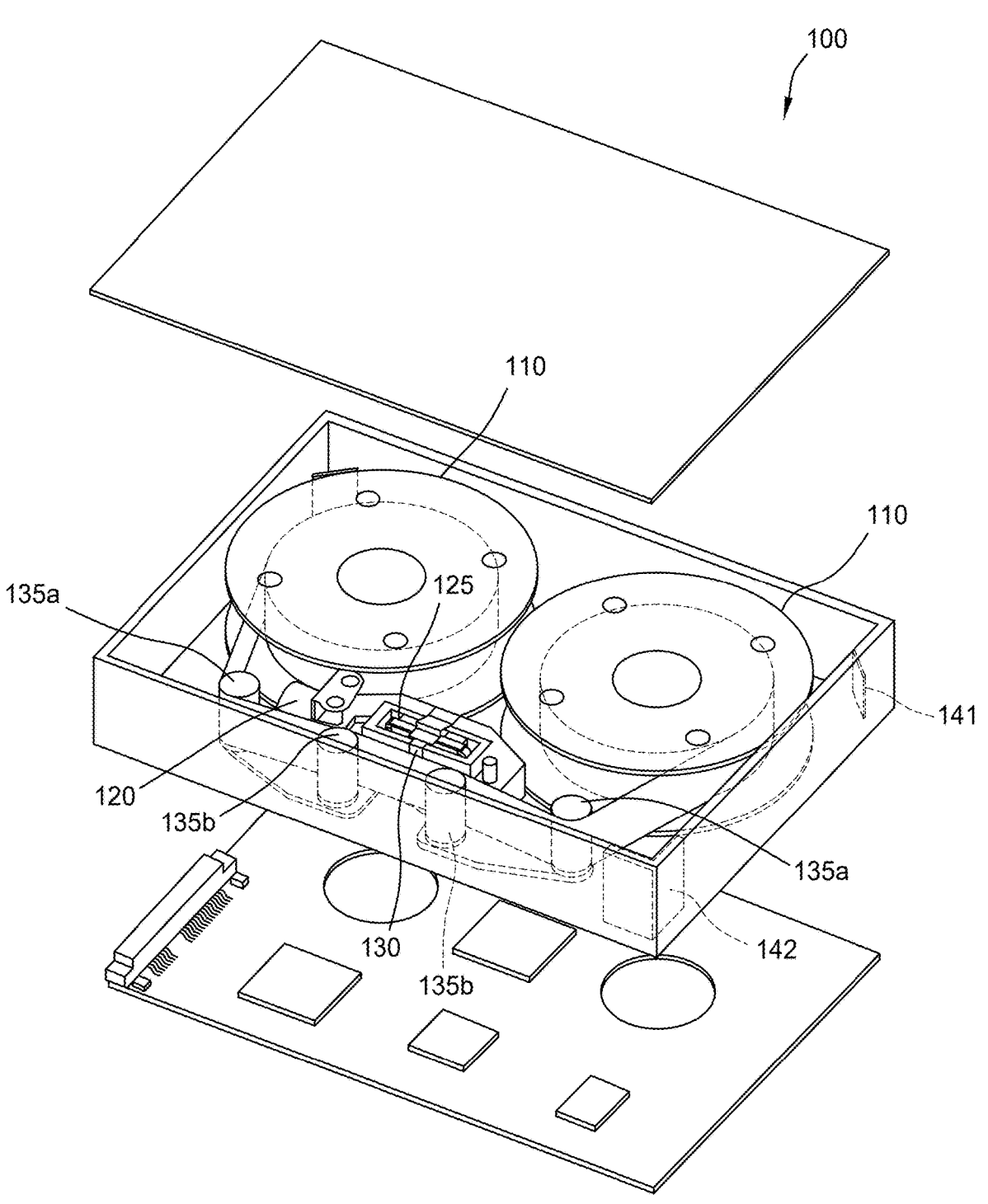
FIGS. 1A-1C illustrate a perspective exploded view, a simplified top down, and side profile view of a tape drive, in accordance with some embodiments.
Figure 1B:
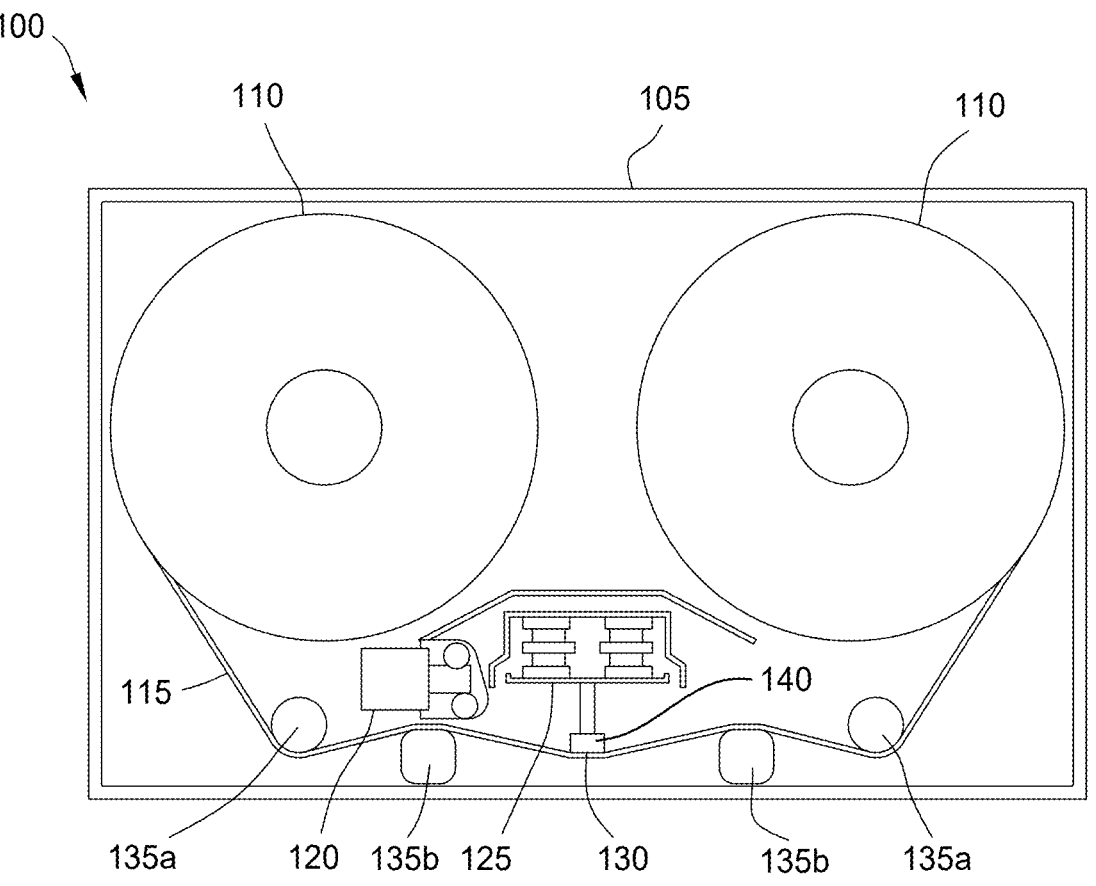
Figure 1C:
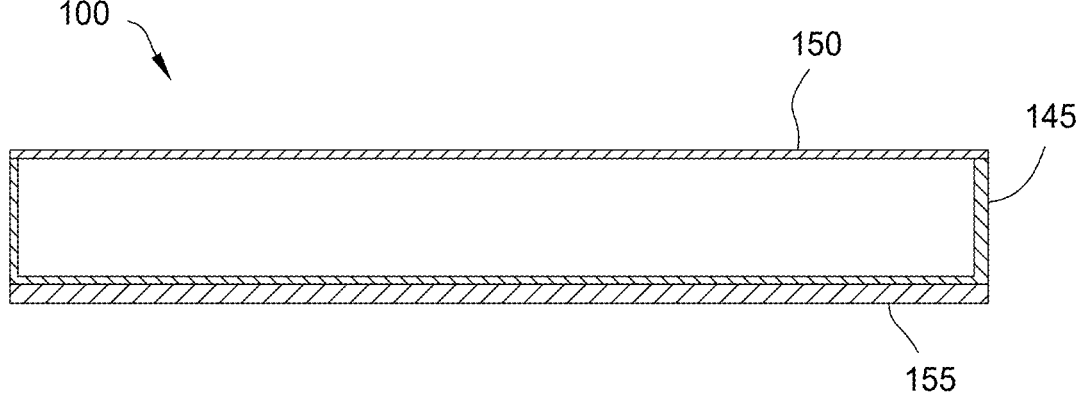

FIGS. 1A-1C illustrate a perspective exploded view, a simplified top down, and side profile view of a tape drive 100, in accordance with some embodiments. The tape drive 100 may be a captive tape drive or a tape embedded drive (TED). Focusing on FIG. 1B, for example, the tape drive comprises a casing 105, one or more tape reels 110, one or more motors (e.g., a stepping motor 120 (also known as a stepper motor), a voice coil motor (VCM) 125, etc.) a head assembly 130 with one or more read heads and one or more write heads, and tape guides/rollers 135a, 135b. In the descriptions herein, the term "head assembly" may be referred to as "magnetic recording head", interchangeably, for exemplary purposes. Focusing on FIG. 1C, for example, the tape drive further comprises a printed circuit board assembly (PCBA) 155. In an embodiment, most of the components are within an interior cavity of the casing, except the PCBA 155, which is mounted on an external surface of the casing 105. The same components are illustrated in a perspective view in FIG. 1A. In the descriptions herein, the term "tape" may be referred to as "magnetic media", interchangeably, for exemplary purposes.

In the illustrated embodiments, two tape reels 110 are placed in the interior cavity of the casing 105, with the center of the two tape reels 110 on the same level in the cavity and with the head assembly 130 located in the middle and below the two tape reels 110. Tape reel motors located in the spindles of the tape reels 110 can operate to wind and unwind the tape media 115 in the tape reels 110. Each tape reel 110 may also incorporate a tape folder to help the tape media 115 be neatly wound onto the reel 110. One or more of the tape reels 110 may form a part of a removable cartridge and are not necessarily part of the tape drive 100. In such embodiments, the tape drive 100 may not be a tape embedded drive as it does not have embedded media, the drive 100 may instead be a tape drive configured to accept and access magnetic media or tape media 115 from an insertable cassette or cartridge (e.g., an LTO drive), where the insertable cassette or cartridge further comprises one or more of the tape reels 110 as well. In such embodiments, the tape or media 115 is contained in a cartridge that is removable from the drive 100. The tape media 115 may be made via a sputtering process to provide improved areal density. The tape media 115 comprises two surfaces, an oxide side and a substrate side. The oxide side is the surface that can be magnetically manipulated (written to or read from) by one or more read/write heads. The substrate side of the tape media 115 aids in the strength and flexibility of the tape media 115.

Tape media 115 from the tape reels 110 are biased against the guides/rollers 135a, 135b (collectively referred to as guides/rollers 135) and are movably passed along the head assembly 130 by movement of the reels 110. The illustrated embodiment shows four guides/rollers 135a, 135b, with the two guides/rollers 135a furthest away from the head assembly 130 serving to change direction of the tape media 115 and the two guides/rollers 135b closest to the head assembly 130 by pressing the tape media 115 against the head assembly 130.

As shown in FIG. 1A, in some embodiments, the guides/rollers 135 utilize the same structure. In other embodiments, as shown in FIG. 1B, the guides/rollers 135 may have more specialized shapes and differ from each other based on function. Furthermore, a lesser or a greater number of rollers may be used. For example, the two function rollers may be cylindrical in shape, while the two functional guides may be flat-sided (e.g., rectangular prism) or clip shaped with two prongs and the film moving between the prongs of the clip.

The voice coil motor 125 and stepping motor 120 may variably position the tape head(s) transversely with respect to the width of the recording tape. The stepping motor 120 may provide coarse movement, while the voice coil motor 125 may provide finer actuation of the head(s). In an embodiment, servo data may be written to the tape media to aid in more accurate position of the head(s) along the tape media 115.

In addition, the casing 105 comprises one or more particle filters 141 and/or desiccants 142, as illustrated in FIG. 1A, to help maintain the environment in the casing. For example, if the casing is not airtight, the particle filters may be placed where airflow is expected. The particle filters and/or desiccants may be placed in one or more of the corners or any other convenient place away from the moving internal components. For example, the moving reels may generate internal airflow as the tape media winds/unwinds, and the particle filters may be placed within that airflow.

There is a wide variety of possible placements of the internal components of the tape drive 100 within the casing 105. In particular, as the head mechanism is internal to the casing in certain embodiments, the tape media 115 may not be exposed to the outside of the casing 105, such as in conventional tape drives. Thus, the tape media 115 does not need to be routed along the edge of the casing 105 and can be freely routed in more compact and/or otherwise more efficient ways within the casing 105. Similarly, the head(s) 130 and tape reels 110 may be placed in a variety of locations to achieve a more efficient layout, as there are no design requirements to provide external access to these components.

As illustrated in FIG. 1C, the casing 105 comprises a cover 150 and a base 145. The PCBA 155 is attached to the bottom, on an external surface of the casing 105, opposite the cover 150. As the PCBA 155 is made of solid state electronics, environmental issues are less of a concern, so it does not need to be placed inside the casing 105. That leaves room inside casing 105 for other components, particularly, the moving components and the tape media 115 that would benefit from a more protected environment.

In some embodiments, the tape drive 100 is sealed. Sealing can mean the drive is hermetically sealed or simply enclosed without necessarily being airtight. Sealing the drive may be beneficial for tape film winding stability, tape film reliability, and tape head reliability. Desiccant may be used to limit humidity inside the casing 105.

In one embodiment, the cover 150 is used to hermetically seal the tape drive. For example, the drive 100 may be hermetically sealed for environmental control by attaching (e.g., laser welding, adhesive, etc.) the cover 150 to the base 145. The drive 100 may be filled by helium, nitrogen, hydrogen, or any other typically inert gas.

In some embodiments, other components may be added to the tape drive 100. For example, a pre-amp for the heads may be added to the tape drive. The pre-amp may be located on the PCBA 155, in the head assembly 130, or in another location. In general, placing the pre-amp closer to the heads may have a greater effect on the read and write signals in terms of signal-to-noise ratio (SNR). In other embodiments, some of the components may be removed. For example, the filters 141 and/or the desiccant 142 may be left out.

In various embodiments, the drive 100 includes controller 140 integrated circuits (IC) (or more simply "a controller 140") (e.g., in the form of one or more System on Chip (SoC)), along with other digital and/or analog control circuitry to control the operations of the drive. For example, the controller 140 and other associated control circuitry may control the writing and reading of data to and from the magnetic media, including processing of read/write data signals and any servo-mechanical control of the media and head module. In the description below, various examples related to writing and reading and verifying of written data, as well as control of the tape head and media to achieve the same, may be controlled by the controller 140. As an example, the controller 140 may be configured to execute firmware instructions for the various same gap verify embodiments described below.

Figure 2:
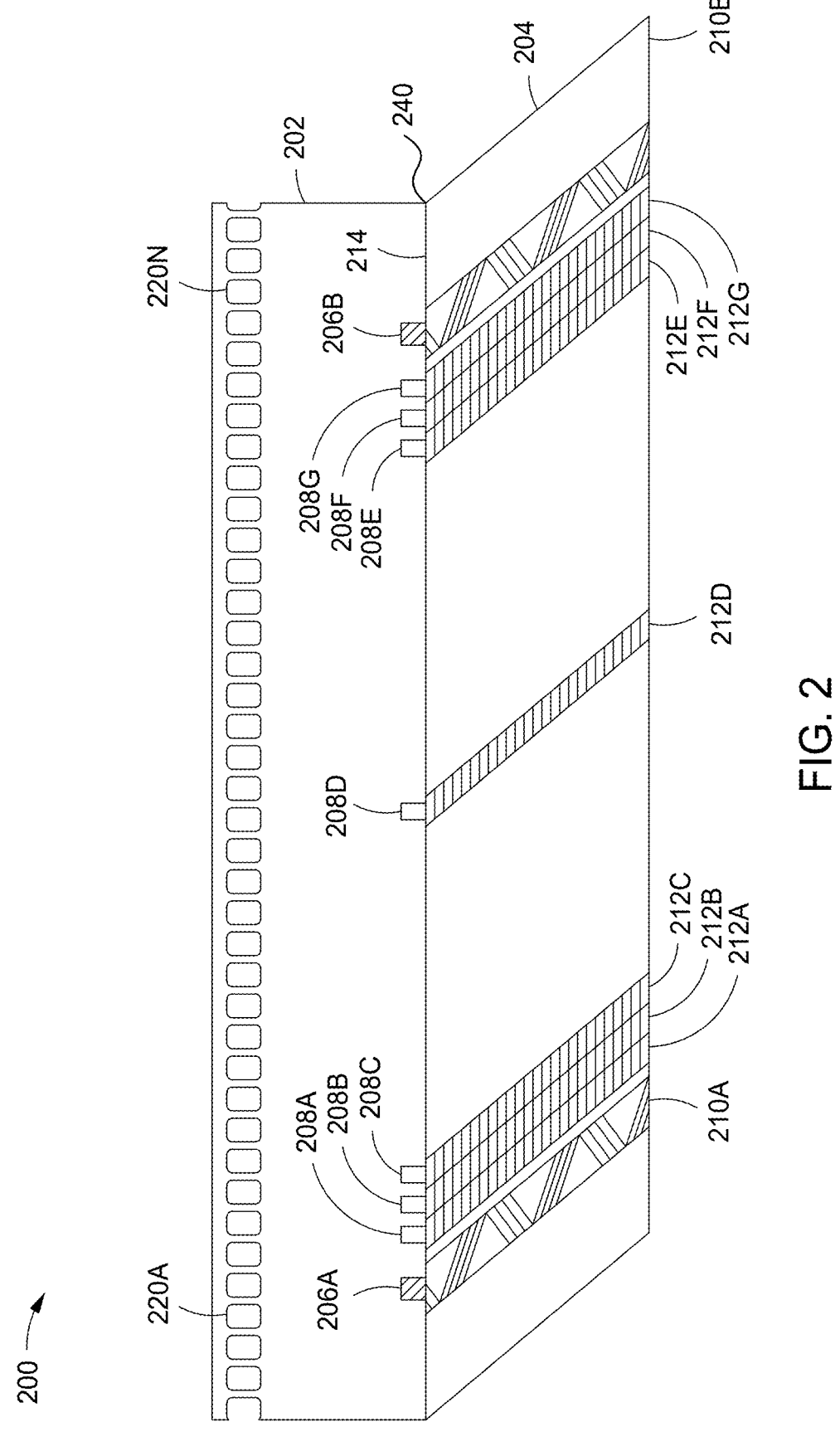
FIG. 2 is a schematic illustration of a tape head and tape that are aligned.

FIG. 2 is a schematic illustration of a tape head module 200 and a tape 204 that are aligned. The tape head module 200 comprises a tape head body 202 that is aligned with the tape 204. The tape 204 moves past the tape head module 200 during read and/or write operations. The tape head module 200 has a media facing surface (MFS) 214 that faces the tape 204. The tape head module 200 is coupled to a controller, which may be the controller 140 of FIG. 1.

The tape head body 202 comprises a first servo head 206A and a second servo head 206B spaced therefrom. It is to be understood that while two servo heads have been shown, the disclosure is not limited to two servo heads. Rather, it is contemplated that more or less servo heads may be present. A plurality of data heads 208A-208G is disposed between the first servo head 206A and the second servo head 206B. It is to be understood that while seven data heads have been shown, the disclosure is not limited to seven data heads. Rather, the number of data heads can be more or less than seven, depending on the requirements of the embodiment. For example there can be sixteen, thirty two, sixty four or more data heads utilized in the tape head body 202.

A plurality of pads 220A-220N is electrically coupled to the data head body 202. The plurality of pads 220A-220N coupled to the data head body 202 is not limited to the number shown in FIG. 2. Rather, more or less pads are contemplated. The pads 220A-220N are used to connect the drive electronics to the servo heads 206A, 206B and to data read and writer elements. The pads 220A-220N are used to establish the potential across the servo reader by means of a power supply (not shown) embedded in the tape head 200.

The tape 204 comprises a first servo track 210A and a second servo track 210B. The first servo track 210A and the second servo track 210B are spaced apart allowing the tape head 200 to monitor and control the average position of the data heads 208A-208G relative to the data tracks 212A-212G on the tape 204. It is to be understood that while two servo tracks have been shown, the disclosure is not limited to two servo tracks. Rather, the number of servo tracks can be more or less than two, depending on the requirements of the embodiment.

The tape 204 further comprises a plurality of data tracks 212A-212G disposed between the first servo track 210A and the second servo track 210B. It is to be understood that while seven data tracks have been shown, the disclosure is not limited to the seven data tracks. Rather, the number of data tracks can be more or less than seven, depending on the requirements of the embodiment. In the embodiment of FIG. 2, the first servo head 206A reads its lateral position information (e.g., alignment) over the first servo track 210A. The second servo head 206B is aligned with the second servo track 210B. The combined information allows the servo actuator of the tape drive 200 to align the data heads 208A-208G such that the center data head (e.g., 208D) is centered on tape 204. The plurality of data heads 208A-208G is thus individually aligned with the plurality of data tracks 212A-212N for best case positioning. In this embodiment the first servo head 206A, the second servo head 206B, the first servo track 210A, the second servo track 210B, the plurality of data heads 208A-208G, and the plurality of data tracks 212A-212G are able to read and/or write the data accurately because all are aligned perpendicular to the direction of travel of the tape 204.

Figure 3:
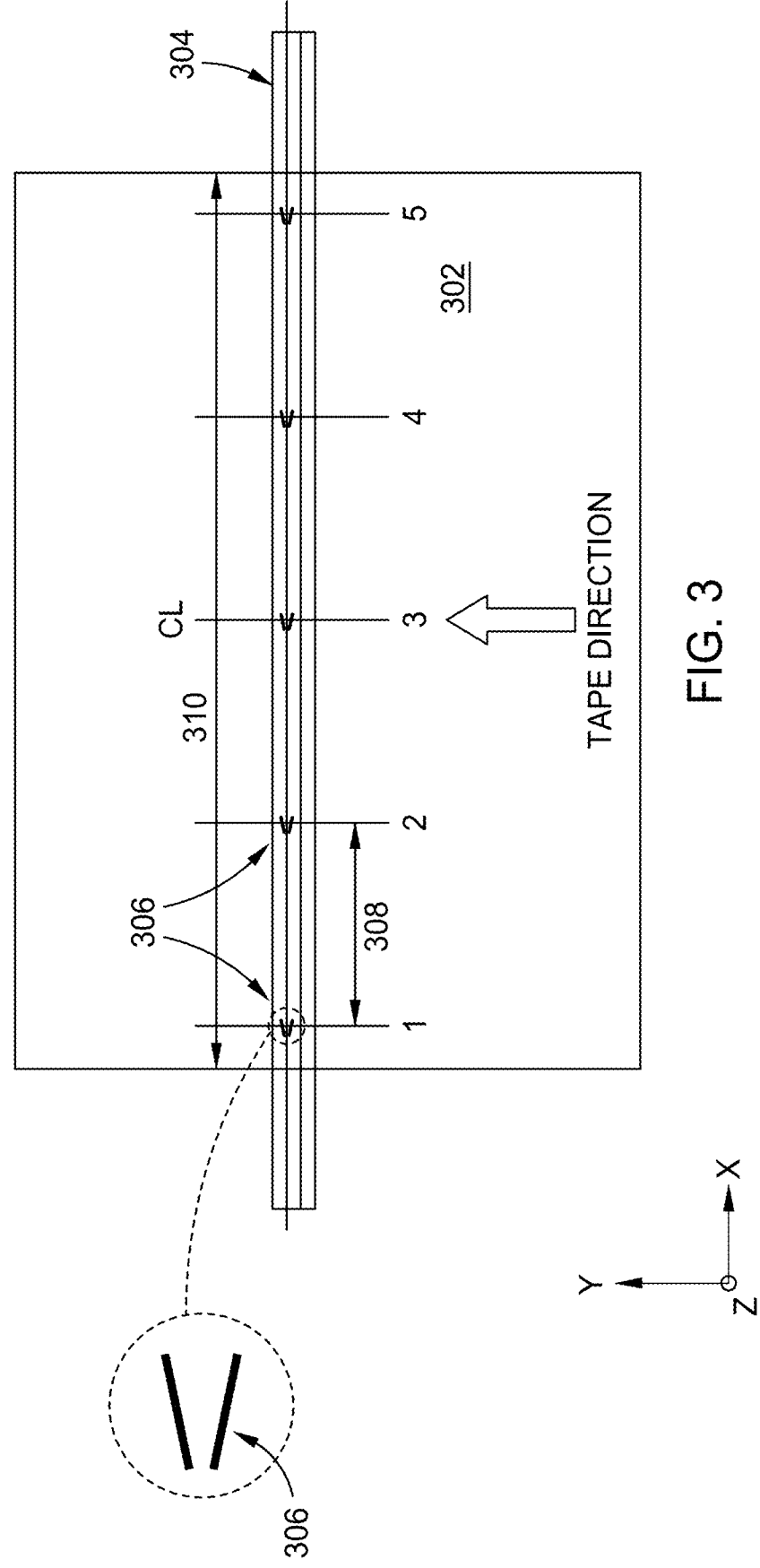
FIG. 3 illustrates a servo write bar disposed over a tape, according to one embodiment.

FIG. 3 illustrates a servo write bar 304 disposed over a tape 302, as part of a device for writing servo patterns onto the tape 302, according to one embodiment. The servo write bar 304 may be used to write the first servo track 210A and the second servo track 210B of FIG. 2.

The servo write bar 304 comprises a plurality of servo patterns 306. A first servo pattern (1) 306 is disposed at a first edge of the tape 302, the third servo pattern (3) 306 is disposed on a centerline (CL) of the tape 302, and a fifth servo pattern (5) 306 is disposed at a second edge of the tape 302 opposite the first edge. The second servo pattern (2) 306 is disposed halfway between the first and third servo patterns 306, and the fourth servo pattern (4) is disposed halfway between the third and fifth servo patterns 306. While five servo patterns 306 are shown, the servo write bar 304 may comprise any number of servo patterns 306. Each servo pattern 306 is disposed on a servo write head, like shown and described below in FIGS. 5A-5D.

Each servo pattern 306 comprises chevron line pairs disposed at an angle of about 12° to about 24°. Each servo pattern 306 is spaced a distance 308 in the x-direction from an adjacent servo pattern 306 by about 2,850 µm to about 2,865 µm, such as about 2,858 µm. The tape 302 has a width 310 in the x-direction (i.e., perpendicular to a direction of tape movement) of about 12,650 µm. The servo write bar 304 has a length in the x-direction greater than the width of the tape 302 by about 4,000 µm. For example, the servo write bar 304 has a length of about 16,600 µm to about 16,700 µm. As shown, the servo write bar 304 may be centered over the tape 302.

FIGS. 4A-4B illustrate a conventional servo write head 400. FIG. 4C illustrates current pulses generated by the conventional servo write head 400 during operation.

As shown in FIGS. 4A and 4B, the conventional servo write head 400 comprises a first pole 408, a top surface 410, a second pole 412 opposite the first pole 408, and a bottom surface 414 opposite the top surface 410. A first servo line 406a and a second servo line 406b are disposed on the top surface 410, forming a servo pattern 406. The first and second servo lines 406a, 406b are cut out as slits in the top surface 410, like shown in FIG. 4B. A coil 402 is wrapped around the first pole 408.

To imprint or write the servo pattern 406 on a tape, current pulses are applied to the coil 402 to generate magnetic flux. As the current pulses, the magnetic flux travels from the first pole 408, across the top surface 410, down the second pole 412, and across the bottom surface 414. The magnetic flux traveling across the top surface 410 imprints the servo pattern 406 on a tape. However, as the flux travels across the top surface 410, the flux decreases, resulting in the flux being higher when imprinting the first servo line 406a. As such, the first servo line 406a may be stronger than the second servo line 406b, making the servo pattern 406 uneven.

As shown in FIG. 4C, when a current pulse of duration 404 is applied to the conventional servo write head 400, the head gaps simultaneously write servo lines 406a and 406b to the tape. This results in a first side of the first servo line 406a disposed adjacent to the first pole 408 having a positive magnetic field on the tape, and a second side of the first servo line 406a having a negative magnetic field on the tape. Similarly, a first side of the second servo line 406b disposed adjacent to the first servo line 406a will have a positive magnetic field on the tape, and a second side of the second servo line 406b will have a negative magnetic field on the tape. While not shown, due to the design of the conventional servo write head 400, the strength of the current pulses used to imprint the servo lines 406a, 406b on the tape may be uneven.

Figure 5A:
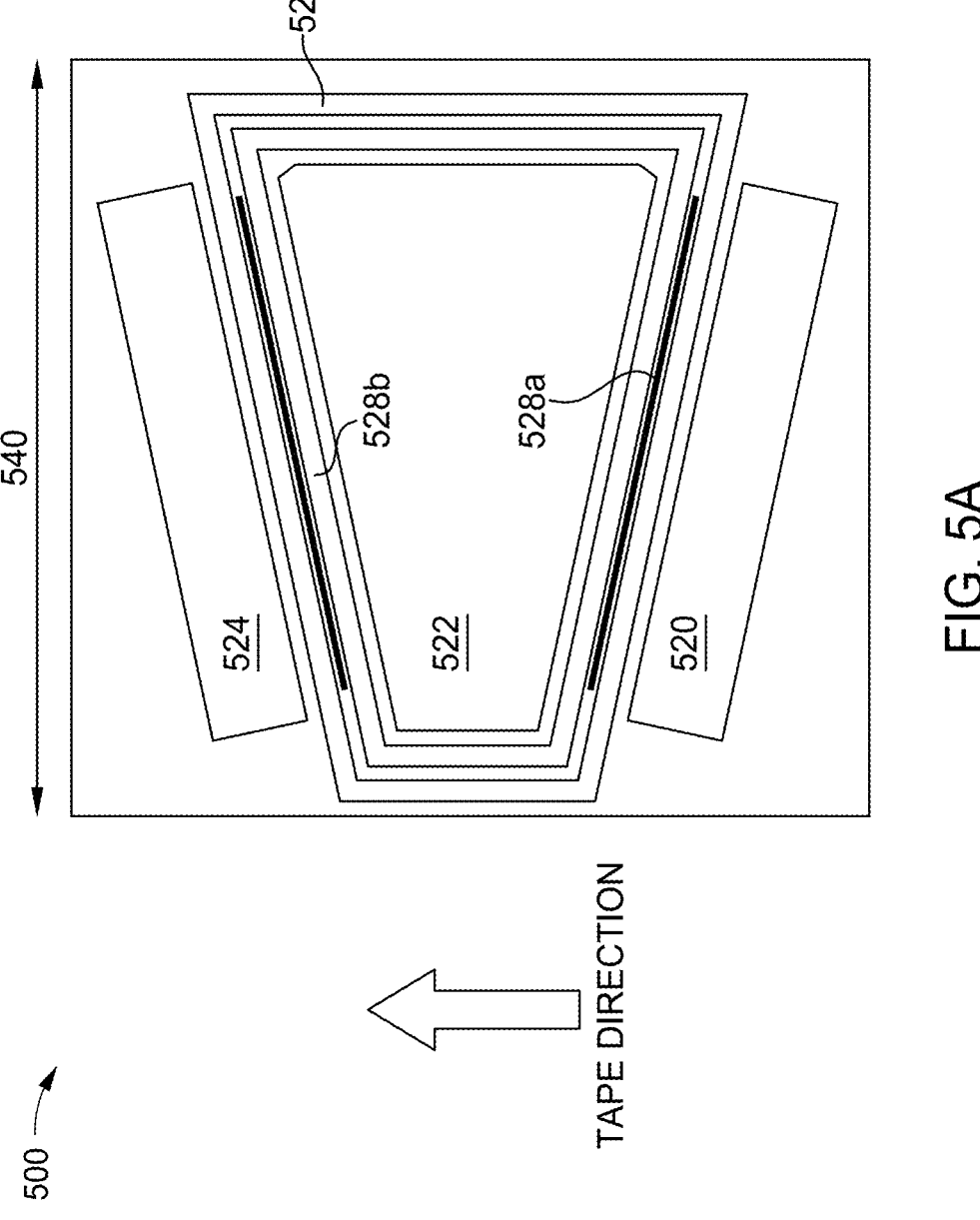
FIGS. 5A-5D illustrate various views of a servo write head of a servo write bar, according to one embodiment.

FIGS. 5A-5D illustrate various views of a servo write head 500 of a servo write bar, according to one embodiment. FIG. 5E illustrates current pulses generated by the servo write head 500 during operation. The servo write head 500 may be used to write the first servo track 210A and the second servo track 210B of FIG. 2. The servo write bar 304 of FIG. 3 may comprise one or more servo write heads 500. Thus, while only one servo pattern 528 is shown on the servo write head 500, a servo write bar may comprise additional servo write heads, such five servo write heads 500 which provide for five servo patterns 528.

The servo write head 500 comprises a first end pole 520, a center pole 522, and a second end pole 524. The center pole 522 is disposed between and spaced from the first end pole 520 and the second end pole 524 such that the spaces or gaps 534a, 534b (shown in FIG. 5C) between the first and second end poles 520, 524 and the center pole 522 are hollow. The first gap 534a (extending from the first end pole 520 to the center pole 522) may have a width of about 10 µm to about 50 µm, and the second gap 534b (extending from the center pole 522 to the second end pole 524) may have a width of about 10 µm to about 50 µm. A coil 526 is wrapped around the center pole 522 and disposed within the gaps 534a, 534b. While two turns of the coil 526 are shown in FIG. 5A, the coil 526 may comprise any number of turns, such as 10 turns or more. The center pole 522 and the first and second end poles 520, 524 may be rectangular, square, or trapezoidal in shape.

In some embodiments, the coil 526 is wrapped around the first end pole 520 or the second end pole 524. In other embodiments, a first coil is wrapped around the first end pole 520 and a second coil is wrapped around the center pole 522; a first coil is wrapped around the center pole 522 and a second coil is wrapped around the second end pole 524; or a first coil is wrapped around the first end pole 520 and a second coil is wrapped around the second end pole 524. In yet another embodiment, a first coil is wrapped around the first end pole 520, a second coil is wrapped around the center pole 522, and a third coil is wrapped around the second end pole 524. Thus, while only one coil 526 is shown wrapped around the center pole 522, one or more coils may be wrapped around the first end pole 520 and/or the second end pole 524.

Figure 5B:
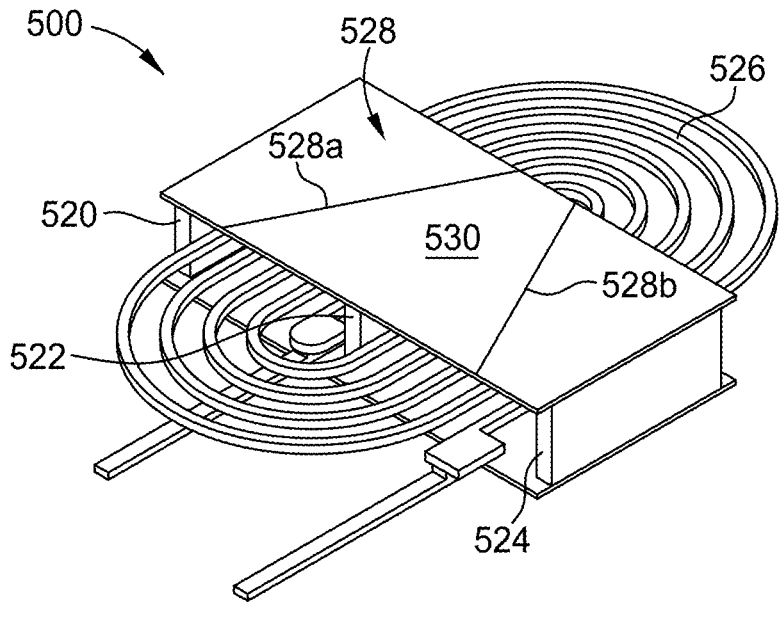
Figure 5C:
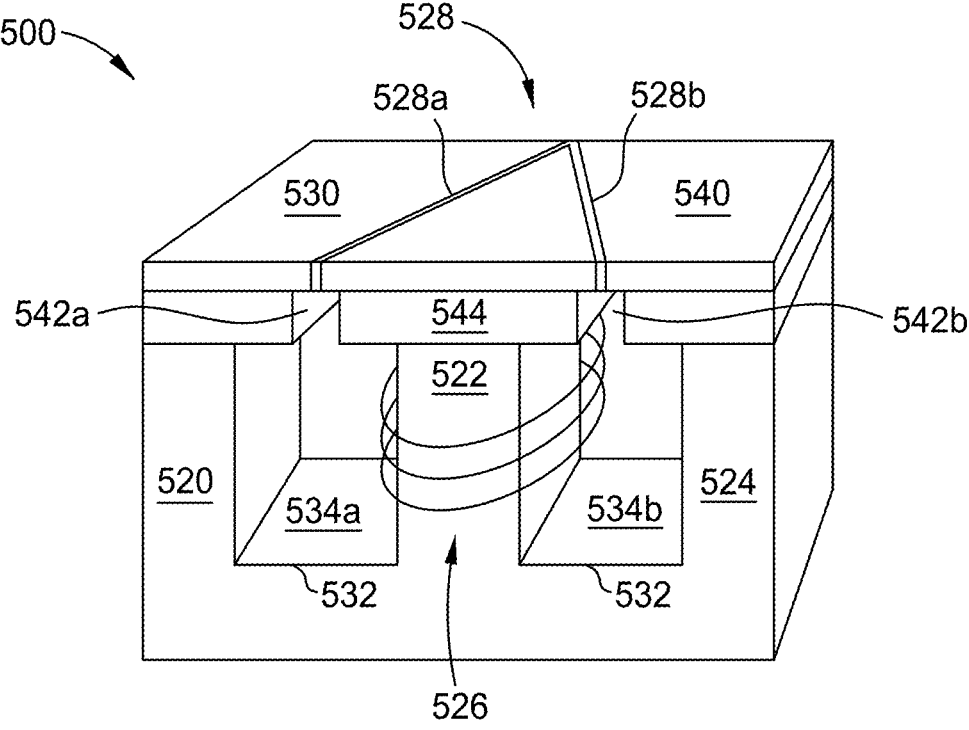
Figure 5D:
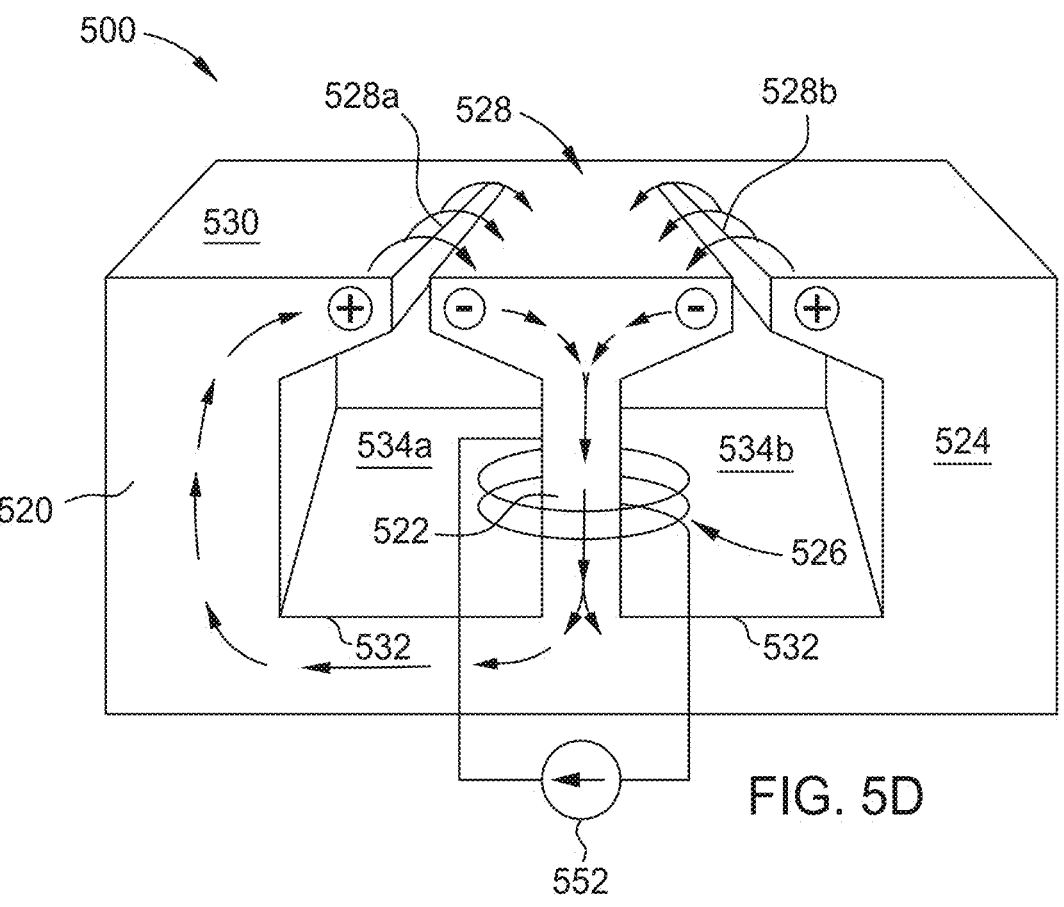
Figure 5E:
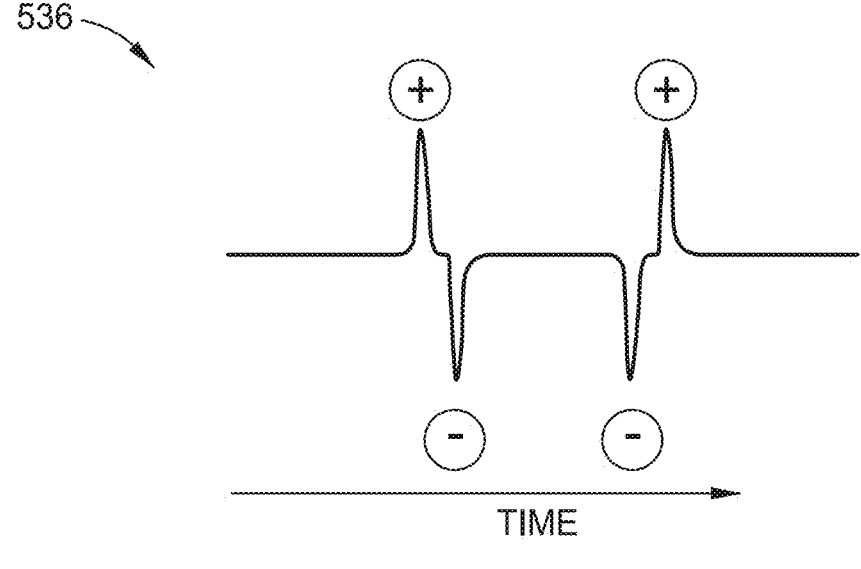
FIG. 5E illustrates current pulses generated by the servo write head of FIGS. 5A-5D during operation.

Like shown in FIGS. 5B-5D, a first servo line 528a and a second servo line 528b are disposed on a top surface 530 of the servo write head 500 to form a servo pattern 528. The first servo line 528a is disposed between the first end pole 520 and the center pole 522 and over the first gap 534a, and the second servo line 528b is disposed between the center pole 522 and the second end pole 524 and over the second gap 534b. The first and second servo lines 528a, 528b may be disposed at an angle of about 12° to about 24°, relative to a reference line that bisects the servo head in the cross-track direction (or parallel to the center pole).

A bottom surface 532 is disposed opposite the top surface. The top surface 530 and the bottom surface 532 are disposed in contact with the first end pole 520, the center pole 522, and the second end pole 524. The top surface 530 and/or the bottom surface 532 may be spaced from the coil 526. As shown in FIG. 5D, the first and second servo lines 528a, 528b may be cut out from the top surface 530. The top surface 530, the bottom surface 532, the center pole 522, and the first and second end poles 520, 524 may each comprise the same magnetically permeable material, such as one or more of an alloy of nickel and iron or an alloy of cobalt and iron. The top surface 530 may comprise CoFe or Fe(N). The coil 526 may comprise Cu. The servo write head 500 may have a length 540 of about 30 µm to about 100 µm.

FIG. 5C illustrates another embodiment of the servo write head 500. In FIG. 5C, a top pole 544 is disposed over the first end pole 520, the center pole 522, and the second end pole 524. A first channel 542a disposed over the first gap 534a and a second channel 542b disposed over the second gap 534b are cut all the way through the top pole 544. The first and second channels 542a, 542b may each have a width of about 100 nm or greater, which is less than width of the first and second gaps 534a, 534b. A thin plate 540 is disposed on the top plate 544. The thin plate 540 is the top surface 530 of the servo write head 500, comprising the servo pattern 528. The first servo line 528a is disposed over and aligned with the first channel 542*a*, and the second servo line 528*b* is disposed over and aligned with the second channel 542*b*. The thin plate 540 helps enable magnetic flux to flow in the desired direction, as discussed further below.

To imprint or write the servo pattern 528 on a tape, a current source 552 pulses current to the coil 526 to generate magnetic flux. The current applied may be about 100 mAmps. As the current pulses, the magnetic flux travels from the first end pole 520, across the top surface 530, and splits to travel down the center pole 522 and across the second end pole 524. The magnetic flux traveling across the top surface 530 imprints the servo pattern 528 on a tape. Because the coil 526 is wrapped around the center pole 522, the magnetic flux is evenly distributed across the top surface 530, unlike with the conventional servo write head 400. Thus, both the first and second servo lines 528*a*, 528*b* are imprinted at the same strength on the tape.

As shown in FIG. 5E, when a current pulse of duration 536 is applied to the servo write head 500 from the current source 552, the current travels over the first servo line 528*a* to write the first servo line 528*a* and then, as time progresses, travels over the second servo line 528*b* to write the second servo line 536*b*. This results in a first side of the first servo line 528*a* disposed adjacent to the first end pole 520 having a positive magnetic field on the tape, and a second side of the first servo line 528*a* disposed adjacent to the center pole 522 having a negative magnetic field on the tape. Similarly, a first side of the second servo line 528*b* disposed adjacent to the center pole 522 will have a negative magnetic field on the tape, and a second side of the second servo line 528*b* disposed adjacent to the second end pole 524 will have a positive magnetic field on the tape. In other words, each side of the first and second servo lines 528*a*, 528*b* disposed adjacent to the center pole 522 has a negative magnetic field. Thus, the negative magnetic fields of the servo pattern 528 are disposed adjacent to one another on the tape. An advantage of such magnetic fields, for example, may be helping to re-acquire servo data after the tape changes direction, or after a track or band change, or in helping acquire tape speed more quickly, in that it immediately identifies which part of the pattern you are on.

A tape will comprise a plurality of data tracks having a tape width, a first servo track disposed adjacent to a first end of the tape width and a second servo track disposed adjacent to a second end of the tape width opposite the first end, the first and second servo tracks each individually comprising a plurality of servo pairs, wherein each servo pair comprises: a first servo bar having an outer edge and an inner edge, the outer edge having a positive magnetic field and the inner edge having a negative magnetic field, and a second servo bar disposed adjacent to the first servo bar, the second servo bar having an inner edge disposed adjacent to the outer edge of the first servo bar and an inner edge, wherein the inner edge of the second servo bar has a negative magnetic field and the outer edge of the second servo bar having a positive magnetic field.

Therefore, by wrapping a coil around a center pole of a servo write head, the magnetic flux is evenly distributed across the servo pattern during operation. As such, the servo lines of the servo pattern are written at the same strength.

In one embodiment, a servo write bar comprises one or more servo write heads, each of the one or more servo write heads comprising: a first end pole, a second end pole, a center pole disposed between the first and second end poles, at least one coil wrapped around the center pole, the first end pole, or the second end pole, a top surface disposed over the at least one coil, the first end pole, the second end pole, and the center pole, and a servo pattern disposed on the top surface, the servo pattern comprising a first servo line disposed between the first end pole and the center pole and a second servo line disposed between the center pole and the second end pole.

The first and second servo lines are each disposed at an angle of about 12° to about 24° relative to a reference line that bisects the write head along the direction of the center pole to form a chevron pattern. The one or more servo write heads are five servo write heads. A device for writing servo patterns on a tape comprises the servo write bar. The device further comprises a current source coupled to the at least one coil. During operation, the current source is configured to pulse current to the at least one coil to write the servo pattern on a tape. The first end pole is spaced from the center pole by a first gap, and the second end pole is spaced from the center pole by a second gap, the at least one coil being disposed in the first and second gaps. The first servo line is disposed over the first gap, and the second servo line is disposed over the second gap. The servo write bar further comprises a top pole disposed in contact with the first end pole, the second end pole, and the center pole, the top pole comprising a first channel aligned with the first servo line and a second channel aligned with the second servo line, and a thin plate disposed over the top pole.

In another embodiment, a servo write bar comprises one or more servo write heads, each of the one or more servo write heads comprising: a first end pole, a second end pole, a center pole disposed between the first and second end poles, the center pole being spaced from the first end pole by a first gap and spaced from the second end pole by a second gap, a coil disposed around the center pole and within the first and second gaps, and a servo pattern disposed over the coil, the servo pattern comprising a first servo line disposed over the first gap and a second servo line disposed over the second gap.

The first and second servo lines are each disposed at an angle of about 12° to about 24° relative to a reference line that bisects the write head along the direction of the center pole to form a chevron pattern. A device for writing servo patterns on a tape comprises the servo write bar. The device further comprises a current source coupled to the coil. During operation, the current source is configured to pulse current to the coil to write the servo pattern on a tape. The current pulse applies about 100 mAmps of current.

The coil comprises ten or more turns. The at least one coil is wrapped around the center pole. The at least one coil is a first coil and a second coil, wherein the first coil is wrapped around the center pole, and wherein the second coil is wrapped around the first end pole or the second end pole.

In yet another embodiment, a servo write bar comprises one or more servo write heads, each of the one or more servo write heads comprising: one or more servo write heads, each of the one or more servo write heads comprising: a first end pole, a second end pole, a center pole disposed between the first and second end poles, the center pole being spaced from the first end pole by a first gap and spaced from the second end pole by a second gap, a coil disposed around the center pole and within the first and second gaps, a current source coupled to the coil, a top surface disposed over the coil, the first end pole, the second end pole, and the center pole, and a servo pattern disposed on the top surface, the servo pattern comprising a first servo line disposed over the first gap and a second servo line disposed over the second gap.

The first and second servo lines are each disposed at an angle of about 12° to about 24° relative to a reference line that bisects the write head along the direction of the center pole to form a chevron pattern. A device for writing servo patterns on a tape comprises the servo write bar. The current pulse applies about 100 mAmps of current. The center pole, the top surface, and the first and second end poles each comprise one or more of an alloy of nickel and iron or an alloy of cobalt and iron. The first and second gaps each have a width of about 100 nm or greater.

A tape comprising a plurality of data tracks having a tape width, a first servo track disposed adjacent to a first end of the tape width and a second servo track disposed adjacent to a second end of the tape width opposite the first end, the first and second servo tracks each individually comprising a plurality of servo pairs, wherein each servo pair comprises: a first servo bar having an outer edge and an inner edge, the outer edge having a positive magnetic field and the inner edge having a negative magnetic field, and a second servo bar disposed adjacent to the first servo bar, the second servo bar having an inner edge disposed adjacent to the outer edge of the first servo bar and an inner edge, wherein the inner edge of the second servo bar has a negative magnetic field and the outer edge of the second servo bar having a positive magnetic field.

While the foregoing is directed to embodiments of the present disclosure, other and further embodiments of the disclosure may be devised without departing from the basic scope thereof, and the scope thereof is determined by the claims that follow.

What is claimed is:

1. A servo write bar, comprising:
one or more servo write heads, each of the one or more servo write heads comprising:
a first end pole;
a second end pole;
a center pole disposed between the first and second end poles;
at least one coil wrapped around at least one of the center pole, the first end pole, or the second end pole;
a top pole disposed over the at least one coil, the first end pole, the second end pole, and the center pole, the top pole being disposed in contact with the first end pole, the second end pole, and the center pole, the top pole comprising a first channel and a second channel; and
a thin plate disposed over the top pole, the thin plate comprising a servo pattern, the servo pattern comprising a first servo line disposed between the first end pole and the center pole and a second servo line disposed between the center pole and the second end pole, wherein the first servo line is aligned with the first channel and the second servo line is aligned with the second channel, and wherein the first and second channels have a greater width than the first and second servo lines.

2. The servo write bar of claim 1, wherein the first and second servo lines are each disposed at an angle of about 12° to about 24° relative to a reference line that bisects the write head along the direction of the center pole to form a chevron pattern.

3. The servo write bar of claim 1, wherein the one or more servo write heads are five servo write heads.

4. A device for writing servo patterns on a tape, comprising the servo write bar of claim 1.

5. The device of claim 4, further comprising a current source coupled to the at least one coil.

6. The device of claim 5, wherein, during operation, the current source is configured to pulse current to the at least one coil to write the servo pattern on a tape.

7. The servo write bar of claim 1, wherein the first end pole is spaced from the center pole by a first gap, and the second end pole is spaced from the center pole by a second gap, the at least one coil being disposed in the first and second gaps.

8. The servo write bar of claim 7, wherein the first servo line is disposed over the first gap, and the second servo line is disposed over the second gap.

9. The servo write bar of claim 1, wherein the at least one coil is wrapped around the center pole.

10. The servo write bar of claim 1, wherein the at least one coil is a first coil and a second coil, wherein the first coil is wrapped around the center pole, and wherein the second coil is wrapped around the first end pole or the second end pole.

11. A servo write bar, comprising:
one or more servo write heads, each of the one or more servo write heads comprising:
a first end pole;
a second end pole;
a center pole disposed between the first and second end poles, the center pole being spaced from the first end pole by a first gap and spaced from the second end pole by a second gap;
a coil disposed around the center pole and within the first and second gaps;
a top pole disposed in contact with the first end pole, the second end pole, and the center pole, the top pole comprising a first channel aligned with the first gap and a second channel aligned with the second gap, wherein the first gap has a greater width than the first channel and the second gap has a greater width than the second channel; and
a thin plate disposed over the top pole, the thin plate comprising a servo pattern disposed over the coil, the servo pattern comprising a first servo line disposed over the first channel and a second servo line disposed over the second channel, wherein the first channel has a greater width than the first servo line and the second channel has a greater width than the second servo line.

12. The servo write bar of claim 11, wherein the first and second servo lines are each disposed at an angle of about 12° to about 24° relative to a reference line that bisects the write head along the direction of the center pole to form a chevron pattern.

13. A device for writing servo patterns on a tape, comprising the servo write bar of claim 11.

14. The device of claim 13, further comprising a current source coupled to the coil.

15. The device of claim 14, wherein, during operation, the current source is configured to pulse current to the coil to write the servo pattern on a tape.

16. The device of claim 15, wherein the current pulse applies about 100 mAmps of current.

17. The servo write bar of claim 11, wherein the coil comprises ten or more turns.

18. A servo write bar, comprising:
one or more servo write heads, each of the one or more servo write heads comprising:
a first end pole;
a second end pole;
a center pole disposed between the first and second end poles, the center pole being spaced from the first end pole by a first gap and spaced from the second end pole by a second gap;
a coil disposed around the center pole and within the first and second gaps;

a current source coupled to the coil;

a top pole disposed over the coil, the first end pole, the second end pole, and the center pole, the top pole comprising a first channel aligned with the first gap and a second channel aligned with the second gap, wherein the first gap has a greater width than the first channel and the second gap has a greater width than the second channel; and a thin plate disposed over the top pole, the thin plate comprising a servo pattern, the servo pattern comprising a first servo line disposed over the first channel and a second servo line disposed over the second channel, wherein the first channel has a greater width than the first servo line and the second channel has a greater width than the second servo line.

19. The servo write bar of claim 18, wherein the first and second servo lines are each disposed at an angle of about 12° to about 24° relative to a reference line that bisects the write head along the direction of the center pole to form a chevron pattern.

20. A device for writing servo patterns on a tape, comprising the servo write bar of claim 18.

21. The device of claim 20, wherein each current pulse applies about 100 mAmps of current.

22. The servo write bar of claim 18, wherein the center pole, the top pole, and the first and second end poles each comprises one or more of an alloy of nickel and iron or an alloy of cobalt and iron.

23. The servo write bar of claim 15, wherein the first and second gaps each have a width of about 100 nm or greater.

24. The device of claim 4, wherein the device is configured to write a first servo line pattern and a second servo line pattern on a tape, wherein the first and second servo line patterns each individually have a positive magnetic field and a negative magnetic field.

25. The device of claim 13, wherein the device is configured to write a first servo line pattern and a second servo line pattern on a tape, wherein the first and second servo line patterns each individually have a positive magnetic field and a negative magnetic field.

* * * * *